United States Patent
Grohmann et al.

(10) Patent No.: US 10,703,183 B2
(45) Date of Patent: *Jul. 7, 2020

(54) METHOD FOR FITTING SEALING PROFILES, BY WAY OF AN ADHESIVE LAYER, ON VEHICLE BODIES OR THE PARTS THEREOF

(71) Applicant: TESLA GROHMANN AUTOMATION GMBH, Prüm (DE)

(72) Inventors: Klaus Grohmann, Hersdorf (DE); Lothar Thommes, Bitburg (DE)

(73) Assignee: TESLA GROHMANN AUTOMATION GMBH, Prum (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/776,669

(22) PCT Filed: Aug. 8, 2017

(86) PCT No.: PCT/EP2017/070106
§ 371 (c)(1),
(2) Date: May 16, 2018

(87) PCT Pub. No.: WO2018/041559
PCT Pub. Date: Mar. 8, 2018

(65) Prior Publication Data
US 2018/0345774 A1    Dec. 6, 2018

(30) Foreign Application Priority Data

Aug. 30, 2016   (DE) .................. 10 2016 116 107

(51) Int. Cl.
*B60J 10/00*   (2016.01)
*B23P 19/04*   (2006.01)
*B25J 11/00*   (2006.01)

(52) U.S. Cl.
CPC ............. *B60J 10/45* (2016.02); *B23P 19/047* (2013.01); *B25J 11/005* (2013.01); *B23P 2700/50* (2013.01)

(58) Field of Classification Search
CPC ... B23P 19/047; B23P 2700/50; B25J 11/005; B29C 66/52296; B29C 66/55; B60J 10/24; B60J 10/34; B60J 10/45
See application file for complete search history.

(56) References Cited

U.S. PATENT DOCUMENTS

| | | | |
|---|---|---|---|
| 8,398,808 B2 | 3/2013 | Grohmann | |
| 2010/0024976 A1* | 2/2010 | Grohmann | B23P 19/047 156/307.1 |

(Continued)

FOREIGN PATENT DOCUMENTS

| | | |
|---|---|---|
| DE | 19704327 C1 | 5/1998 |
| DE | 10138781 A1 | 2/2003 |

(Continued)

*Primary Examiner* — George R Koch
(74) *Attorney, Agent, or Firm* — Lucas & Mercanti, LLP

(57) ABSTRACT

A method for fitting sealing profiles on vehicle bodies or the parts thereof includes withdrawing the sealing profile from an unwinding unit and, by way of an adhesive layer arranged on the sealing profile, rolling of the application device the sealing profile on the vehicle body or the part of the vehicle body, along an application line provided for fitting purposes, by a pressure-exerting roller of an application head. Defects and discontinuities in the sealing profile are detected immediately by the arrangement of an automatic optical inspection system within the application device, on the user side, i.e., in particular without there being any need for markings on the wound-up sealing profile or for data handling between the manufacturer of the sealing profile and the user.

16 Claims, 2 Drawing Sheets

(56) References Cited

U.S. PATENT DOCUMENTS

2016/0176089 A1   6/2016  Kast
2016/0311297 A1  10/2016  Kast

FOREIGN PATENT DOCUMENTS

| DE | 602004000743 T2 | 5/2007 |
| DE | 102006032138 A1 | 8/2007 |
| DE | 102013114775 A1 | 6/2015 |
| EP | 1502790 A1 | 2/2005 |
| EP | 1733839 B1 | 12/2006 |
| WO | 2008104269 A1 | 9/2008 |
| WO | 2015039725 A1 | 3/2015 |
| WO | 2015096880 A1 | 7/2015 |

\* cited by examiner

METHOD FOR FITTING SEALING PROFILES, BY WAY OF AN ADHESIVE LAYER, ON VEHICLE BODIES OR THE PARTS THEREOF

CROSS-REFERENCE TO RELATED APPLICATIONS

This application is a 371 of PCT/EP2017/070106 filed Aug. 8, 2017, which in turn claims the priority of DE 10 2016 116 107.7 filed Aug. 30, 2016, the priority of both applications is hereby claimed and both applications are incorporated herein by reference.

BACKGROUND OF THE INVENTION

The invention relates to a method for applying sealing profiles to vehicle bodies or the parts thereof, wherein the sealing profile is drawn off from an unwinding unit and rolled, by way of an adhesive-bonding layer arranged on the sealing profile, on the vehicle body or the part of the vehicle body, along an application line provided for application purposes, by means of a pressure-exerting roller of an application head.

DE 101 38 781 A1 discloses a method which is intended for applying a seal to a vehicle door and in which the seal, which is present in the form of a sealing profile on a roll, is drawn off from the roll and rolled on, by way of an adhesive-bonding surface present on the seal, around the vehicle door along an application line provided for application purposes.

The expression "rolled on", in combination with this prior art and the present invention, is intended to mean that the sealing profile is pressed continuously on a surface of a vehicle body or a part of the vehicle body, for example a vehicle door, following the predetermined installation or application line, for example with the aid of at least one application roller and is applied in this way.

In order to increase the reliability of production in such methods, EP 1 733 839 B1 proposes that the sealing profile produced by continuous extrusion should be checked before being wound up onto a roll which is intended for use in an application apparatus. If the check prior to the sealing profile being wound up detects defective portions, so-called defects, of the sealing profile, these defects are marked and/or the starting and end coordinates thereof are stored. The defects are portions of the sealing profile which are unsuitable for processing, for example portions which have damage or irregularities on the sealing-profile surface. The manufacturer checks the extruded sealing profile by means of a checking unit. A marking unit, for example an ink-jet printer, arranged downstream of the checking unit identifies the defects by way of markings at the start and end of the defect. A further option is that of applying an interrupted or uninterrupted marking along the defect.

In the case of the known method, relatively long defects are separated out even before the sealing profile is wound up onto the roll. Profile ends produced as a result are joined to one another again, preferably adhesively bonded. Shorter defects are severed in the application apparatus, with reference to the marking(s) generated before the sealing profile is wound up onto the roll and/or with reference to the starting and end coordinates of the defect(s) stored in the application apparatus, i.e. by the user and are separated out in the form of waste.

A significant disadvantage of the known method is that it is necessary to coordinate the marking of the defects provided by the manufacturer and/or the data handling by way of which the starting and end coordinates are stored on the user's application apparatus, which is remote from the manufacturer of the sealing profile. To this extent, there is a need for close coordination between the manufacturer of the sealing profile wound up on rolls and the manufacturer and user of the application apparatus, so that the user can reliably sever defective portions with reference to the markings generated by the manufacturer and/or with reference to stored starting and end coordinates.

BRIEF SUMMARY OF THE INVENTION

Proceeding from this prior art, the object of the invention is to propose a method and an apparatus which are intended for applying sealing profiles of the type mentioned in the introduction and which do not have the aforementioned disadvantages.

The object is solved on the basis of the idea of the arrangement of an automatic optical inspection system within the application apparatus providing for direct detection of defects and discontinuities of the sealing profile by the user, i.e. in particular without any need for the markings on the sealing profile wound up on the roll or for data handling between the manufacturer of the sealing profile and the user. The optical inspection system uses image processing to detect not just defects of the sealing profile, but also the discontinuities, not tolerated in automobile production, at which the profile ends are joined to one another. As already explained in the introduction, such discontinuities can occur at the manufacturer's, when relatively long defects are being separated out, and at the user's, when the roll of wound-up sealing profile is being changed over. The image-processing procedure of the inspection system is configured such that it detects any defects and discontinuities present in the sealing profile as the sealing profile passes through the buffer.

In particular, there is no need, in the case of the method according to the invention, for the manufacturer of the sealing profile to check the latter for defects and/or discontinuities before it is wound up onto the roll. This also does away with the need for marking such defects and/or discontinuities of the sealing profile or for providing for corresponding data handling. In addition to achieving cost-related advantages in the production of the sealing profile, there is no need for close coordination between the manufacturer of the sealing profile and the manufacturer and user of the application apparatus.

If the inspection system does not detect any defects or discontinuities as the sealing profile passes through, the transportation of the sealing profile in the direction of each application roller is interrupted as soon as the end of the sealing profile has reached a starting position for applying the sealing profile. If, meanwhile, defects or discontinuities are detected by the inspection system, that portion of the sealing profile which has the defects is advanced in the direction of each application roller to the extent where said portion can be cut off by the severing device, which is present in any case on the application head.

In order to ensure that a non-defective portion of the sealing profile is applied along the entire sealing-profile application line provided, the transporting path of the sealing profile between the inspection system and the starting position for applying the sealing profile is determined such that the length thereof corresponds at least to the length of the application line provided for applying the sealing profile. The portion of the sealing profile between the inspection system and the starting position has been inspected for defects and discontinuities beforehand by the inspection system. If the inspection system does not detect any defect in this portion, the latter is applied along the application line.

If the inspection system, meanwhile, has detected a defect or discontinuity while the sealing profile is being transported to the starting position for applying the sealing profile, then the portion with the detected defect or discontinuity cannot be used. The portion is then advanced to the extent where the portion including the defect or discontinuity can be severed by the severing device on the application head and separated out.

In order for the sealing profile to be applied, a relative movement between the application head and the vehicle body or the part thereof is necessary. This relative movement can preferably be generated with the aid of a handling robot, which moves the vehicle-body part. In principle, however, it is likewise conceivable for the vehicle body or the part thereof to be fixed in a stationary position while the sealing profile is being applied and for the application head to be moved relative to the vehicle part or the body with the aid of a handling robot.

The manufacturer of the sealing profile can supply the sealing profile on the roll in a state in which it has been pre-fabricated with an adhesive-bonding strip. As an alternative, provision is made, in one configuration of the invention, for the sealing profile wound up onto the roll not to have any adhesive-bonding strip; rather, the latter is applied continuously to the sealing profile in the application apparatus by a production unit. The disadvantages of pre-fabricated sealing profiles can be avoided as a result of the operation of applying the adhesive-bonding strip being integrated in the application apparatus. For example, there is a risk of the liner becoming prematurely detached from the adhesive-bonding layer and of it thus not being possible for the sealing profile to be properly adhesively bonded. In addition, the quality of the different batches can vary as a result of the adhesive-bonding strip being adhesively bonded during the extrusion of the sealing profile. The act of integrating the operation of producing the sealing profile in the application apparatus is known from WO 2008/104269 A1, which is attributable to the applicant of the present patent application. In respect of integrating the production unit in the application method, and in the application apparatus for implementing the method, reference is therefore made expressly to the disclosure above. In combination with the present invention, the act of integrating the operation of producing the application apparatus provides for the user to have the greatest possible level of independence from the manufacturer of the extruded sealing profile.

BRIEF DESCRIPTION OF THE DRAWINGS

The present invention will be explained in more detail hereinbelow with reference to the figures, in which.

DETAILED DESCRIPTION OF THE PREFERRED EMBODIMENTS

Figure 1:
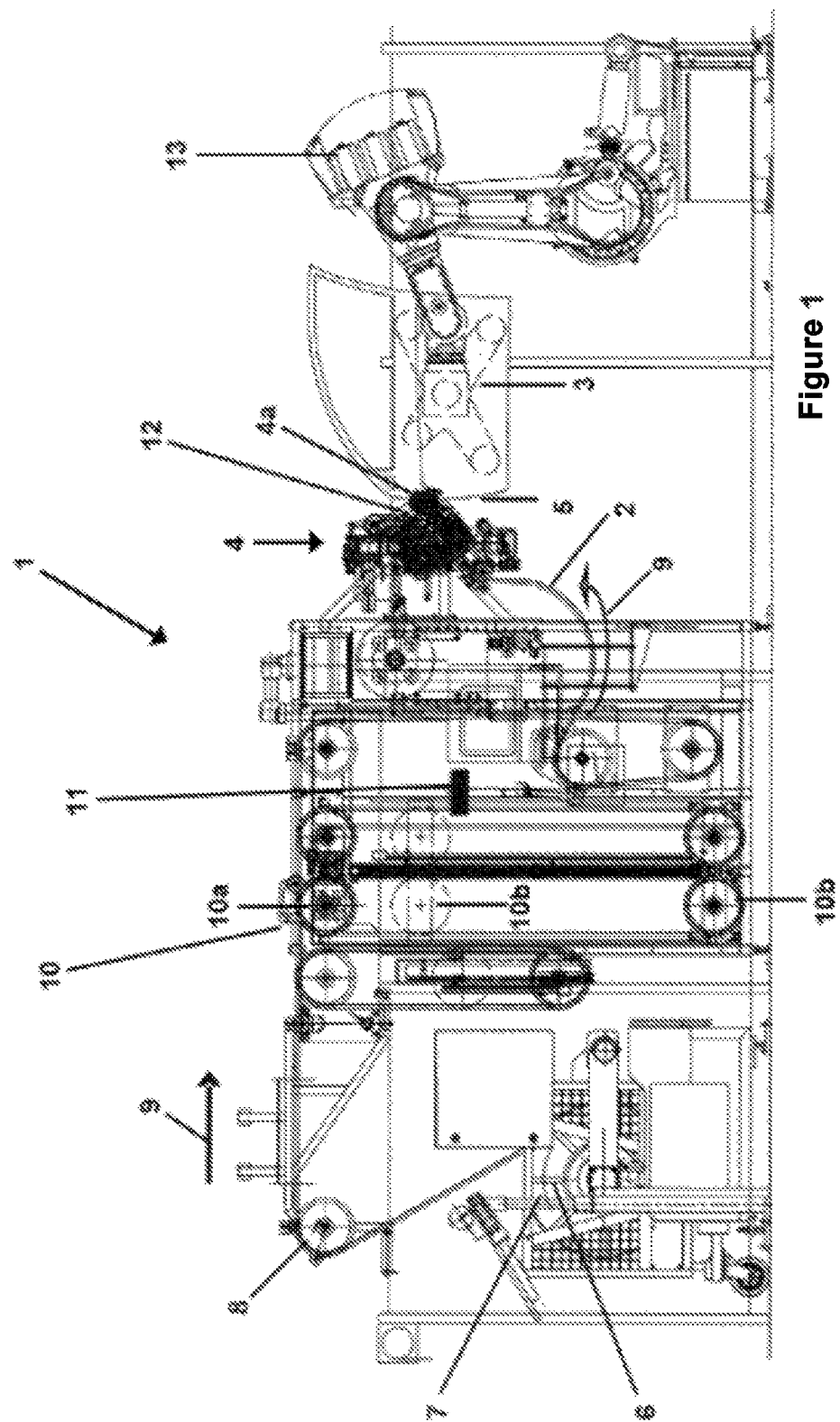
FIG. 1: shows a schematic view of an application apparatus for implementing the method according to the invention.

FIG. 1 shows an application apparatus (1) for applying a sealing profile (2) to a vehicle door (3) by means of an application head (4) comprising a pressure-exerting roller (4a). In the exemplary embodiment, the sealing profile (2) is applied to a surface (5) which is oriented in the upward direction out of the plane of the vehicle door, and therefore out of the plane of the drawing, approximately at right angles. The application line on said surface, the application line being provided for the application of the sealing profile (2), corresponds to the contour of the vehicle door (3), which is illustrated merely schematically.

In specific terms, the application apparatus (1) has a sealing profile (2) wound up onto a roll (6), an unwinding unit (7) for accommodating the roll (6) in a rotatable manner, and drawing-off means (8) for drawing off the sealing profile (2) from the unwinding unit (7). The drawing-off means (8) are constituted in particular, as illustrated in FIG. 1, by a driven deflecting roller.

A buffer (10) is arranged downstream of the unwinding unit (7), as seen in the transporting direction (9) of the sealing profile (2), and, by way of rollers (10a, 10b) of which the distance apart from one another can be altered, can compensate for fluctuations between the inflow and outflow speeds of the sealing profile (2). The distance is altered by means of an adjustment drive (not illustrated) while the sealing profile (2) is running around the rollers (10a,b).

The application apparatus (1) also comprises an automatic optical inspection system (11), which is aligned with the buffer (10) and is intended for detecting defects and discontinuities as the sealing profile (2) passes through the buffer (10). The inspection system (1) may have one or more cameras, which are directed onto the surface of the sealing profile (2). The image-processing procedure on which the optical inspection system is based is configured such that it detects both defects and discontinuities of the sealing profile (2) as it passes through.

Figure 2:
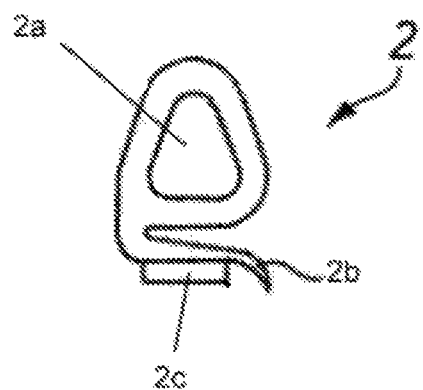
FIG. 2: shows an illustration of a sealing profile with an adhesive-bonding strip arranged thereon.

FIG. 2 illustrates a cross section of the sealing profile (2) wound up onto the roll (6). The sealing profile (2) comprises a hollow profile (2a) with a lip (2b), which is arranged on the hollow profile and to which an adhesive-bonding strip (2c) has been applied.

The application apparatus (1) also has a severing device (12), by means of which the sealing profile (2) applied to the vehicle door (3) is cut off cleanly at the end of the application operation. The severing device comprises, in particular, a cutting blade and, possibly, a mating blade which can be rotated about an axis of rotation. It is additionally possible to provide an immersion bath with a release agent. There are no problems inherent in the mating blade coming into contact with the adhesive-bonding layer when the sealing profile (2) with adhesive adhering thereto is being cut off, since, following each cutting operation, the rotating mating blade is rotated onward and therefore, one after the other, the different effective cutting edges of the mating blade dip into the release agent in the immersion bath, and therefore contamination of the cutting and mating blades by residues of adhesive is avoided.

The application apparatus described with reference to FIG. 1 operates as follows:

A roll (6) with a non-marked sealing profile (2) unchecked by the manufacturer is supplied on the roll (6) in the unwinding unit (7). The unwinding unit (7) comprises a transporting container, in which the roll (6) is mounted in a rotatable manner, it therefore being possible for the sealing profile to be drawn off from the roll (6) with the aid of the driven deflecting roller. While the sealing profile (2) is passing through the buffer (10), it is inspected for defects and discontinuities by the optical inspection system (11). If a controller (15) detects defects or discontinuities, the portion of the sealing profile (2) with the detected defect or discontinuity is advanced in the direction of the application roller (4a) in the application head (4) to the extent where said portion can be cut off by the severing device (12) on the application head (4). This ensures that the sealing profile is applied along the application line only when the entire portion between the inspection system and the application roller is non-defective, i.e. the optical inspection system (11) has not detected any defect or discontinuity over this length of the sealing profile. As soon as a non-defective portion of the sealing profile is present in said portion between the optical inspection system (11) and pressure-exerting roller (4a), the transportation of the sealing profile is interrupted as soon as the end of the sealing profile has reached a starting position for applying the sealing profile to the vehicle door (3). The sealing profile is then applied to the vehicle door (3), along the application line provided for application purposes, by said vehicle door (3) being moved relative to the application head of the application apparatus (1) by the robot (13). The movement of the robot arm is controlled such that the application roller moves precisely along the vehicle door (3), along the application line provided. Once the sealing profile has been applied to the vehicle door (3), the latter is cut off by the severing device (12).

Until the robot (13) supplies the next door (3) in order for the sealing profile (2) to be applied, the sealing profile (2), which is drawn off continuously from the roll (6), is stored on an interim basis in the buffer (10).

| List of reference signs: | |
|---|---|
| No. | Description |
| 1 | application apparatus |
| 2 | sealing profile |
| 2a | hollow profile |
| 2b | lip |
| 2c | adhesive-bonding strip |
| 3 | vehicle door |
| 4 | application head |
| 4a | application roller |
| 5 | surface |
| 6 | roll |
| 7 | unwinding unit |
| 8 | drawing-off means |
| 9 | transporting device |
| 10 | buffer |
| 10a, b | deflecting rollers |
| 11 | optical inspection system |
| 12 | severing device |
| 13 | robot |

The invention claimed is:

1. A method for applying sealing profiles to a vehicle body or a part of the vehicle body by way of an adhesive-bonding layer using an application apparatus, the method comprising the steps of:
    drawing a sealing profile from a roll in an unwinding unit of the application apparatus on which the sealing profile is wound, wherein the sealing profile wound on the roll is not checked for defects and/or discontinuities and the defects and/or the discontinuities of the sealing profile are not marked before the sealing profile is wound on the roll, where the defects are portions of the sealing profile that are unsuitable for processing and the discontinuities are profile ends that are joined to one another;
    passing the sealing profile that has been drawn from the unwinding unit through a buffer of the application apparatus, the buffer compensating for fluctuations between an inflow speed and an outflow speed of the sealing profile;
    inspecting the sealing profile and directly detecting the defects and/or the discontinuities using an optical inspection system configured to directly detect the defects and/or the discontinuities as the sealing profile passes through the buffer;
    rolling the sealing profile, by way of the adhesive-bonding layer, on the vehicle body or the part of the vehicle body, along an application line provided for application purposes, by an application roller of an application head; and
    before the step of rolling, severing and separating out portions of the sealing profile with the defects and/or the discontinuities detected by the optical inspection system from the sealing profile.

2. The method as claimed in claim 1, further comprising a step of cutting off the portion of the sealing profile applied to the vehicle body or the part of the vehicle body by a severing device which is arranged on the application head.

3. The method as claimed in claim 1, further comprising a step of interrupting a transportation of the sealing profile in a direction of the application roller when an end of the sealing profile has reached a starting position for applying the sealing profile.

4. The method as claimed in claim 2, wherein the portions of the sealing profile with the defects and/or the discontinuities detected by the optical inspection system are advanced toward the application roller to an extent that the portions of the sealing profile with the defects and/or the discontinuities can be cut off by the severing device on the application head.

5. The method as claimed in claim 1, wherein a length of a transporting path of the sealing profile between the optical inspection system and a starting position for applying the sealing profile is set to be equal to or greater than a length of the application line provided for applying the sealing profile.

6. The method as claimed in claim 1, further comprising a step of moving the vehicle body or the part of the vehicle body relative to the application head of the application apparatus with the aid of a robot during said step of rolling to apply the sealing profile.

7. The method as claimed in claim 1, further comprising a step of continuously applying an adhesive-bonding strip having the adhesive-bonding layer to the sealing profile in the application apparatus.

8. The method as claimed in claim 1, wherein the sealing profile wound up onto the roll has an adhesive-bonding strip.

9. An application apparatus for implementing the method as claimed in claim 1, comprising:
    a sealing profile wound up onto a roll, wherein the sealing profile is not checked for defects and/or discontinuities and the defects and/or the discontinuities of the sealing profile are not marked before the sealing profile is wound on the roll, where the defects are portions of the sealing profile that are unsuitable for processing and the discontinuities are profile ends that are joined to one another;
    an unwinding unit configured to accommodate the roll in a rotatable manner;
    a driven roller for drawing off the sealing profile from the unwinding unit;
    a buffer arranged downstream of the unwinding unit in a transporting direction of the sealing profile, the buffer compensating for fluctuations between an inflow speed and an outflow speed of the sealing profile;

an optical inspection system aligned with the buffer and configured to inspect the sealing profile and directly detect the defects and/or the discontinuities as the sealing profile passes through the buffer;

a severing device configured to sever portions of the sealing profile having the defects and/or the discontinuities detected by the optical inspection system from the sealing profile; and an application head having an application roller for rolling the sealing profile on the vehicle body or the part of the vehicle body.

10. The application apparatus as claimed in claim 9, wherein the severing device is arranged on the application head.

11. The application apparatus as claimed in claim 9, further comprising a limit switch arranged on the application head interrupting a transportation of the sealing profile toward the application roller as soon as an end of the sealing profile has reached a starting position for applying the sealing profile to the vehicle body or the part of the vehicle body.

12. The application apparatus as claimed in claim 10, further comprising a controller, wherein the optical inspection system is connected to the controller, and the controller is configured such that portions of the sealing profile with the defects and/or the discontinuities detected by the optical inspection system are advanced toward the application roller to the extent that the portions of the sealing profile with the defects and/or the discontinuities can be cut off by the severing device on the application head.

13. The application apparatus as claimed in claim 9, wherein a length of a transporting path of the sealing profile between the optical inspection system and the application roller is equal to or greater than a length of the application line provided for applying the sealing profile.

14. The application apparatus as claimed in claim 9, further comprising a handling robot generating a relative movement between the vehicle body or the part of the vehicle body and the application head.

15. The application apparatus as claimed in claim 9, further comprising a production unit configured to apply an adhesive-bonding strip to the sealing profile.

16. The application apparatus as claimed in claim 9, wherein the sealing profile wound up onto the roll has an adhesive-bonding strip.

* * * * *